(12) United States Patent
Jeong et al.

(10) Patent No.: US 7,840,915 B2
(45) Date of Patent: Nov. 23, 2010

(54) METHODS AND MEDIA FOR FORMING A BOUND NETWORK

(75) Inventors: Cheoljoo Jeong, Leonia, NJ (US);
Steven M. Nowick, Leonia, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 817 days.

(21) Appl. No.: 11/701,864

(22) Filed: Feb. 1, 2007

(65) Prior Publication Data

US 2007/0300203 A1 Dec. 27, 2007

Related U.S. Application Data

(60) Provisional application No. 60/764,700, filed on Feb. 1, 2006, provisional application No. 60/772,945, filed on Feb. 14, 2006.

(51) Int. Cl.
*G06F 17/50* (2006.01)
(52) U.S. Cl. .................................. 716/1; 716/3; 716/18
(58) Field of Classification Search ...................... 716/1, 716/3, 18
See application file for complete search history.

(56) References Cited

U.S. PATENT DOCUMENTS

| | | | | |
|---|---|---|---|---|
| 6,020,754 | A * | 2/2000 | Sobelman et al. | 326/35 |
| 6,031,390 | A * | 2/2000 | Fant et al. | 326/36 |
| 6,334,205 | B1 * | 12/2001 | Iyer et al. | 716/7 |
| 6,557,144 | B1 * | 4/2003 | Lu et al. | 716/2 |
| 2008/0163152 | A1 * | 7/2008 | Kheterpal et al. | 716/18 |

OTHER PUBLICATIONS

Beerel, P. A., "CAD Tools for the Synthesis, Verification, and Testability of Robust Asynchronous Circuits," PhD thesis, Stanford University, 1994.
Beerel et al., "Optimizing average-case delay in technology mapping of burst-mode circuits," Int. Symp. Asynchronous Circuits and Systems, 1996, pp. 244-259.
Brej, C. F., "Early Output Logic and Anti-Tokens," PhD thesis, University of Manchester, 2005.
Burns, S. M., "General conditions for the decomposition of state holding elements," In Proc. Int. Symp. Asynchronous Circuits and System, 1996, pp. 48-57.

(Continued)

*Primary Examiner*—Jack Chiang
*Assistant Examiner*—Magid Y Dimyan
(74) *Attorney, Agent, or Firm*—Wilmer Cutler Pickering Hale and Dorr LLP

(57) ABSTRACT

Methods and media for forming a bound network are provided. In some embodiments, methods for forming a bound network include: decomposing an asynchronous input network to form a network of base functions, wherein the network of base functions includes simple base functions that include two-input threshold OR functions and two-input threshold AND functions with hysteresis, and complex base functions generated during the decomposing; partitioning the network of base functions into at least one subject graph, each portion of the at least one subject graph having a function; determining matches between the at least one subject graph and one or more pattern graphs; and selecting at least one of the one or more pattern graphs to be used in the bound network for the function of each of different portions of the at least one subject graph.

25 Claims, 16 Drawing Sheets

OTHER PUBLICATIONS

Chaudhary et al., "Computing the area versus delay tradeoff curves in technology mapping," IEEE Trans. Computer-Aided Des. Integr. Circuits Syst., Dec. 1995, 1):1480-1489.

Chelcea et al., "Resynthesis and peephole transformations for the optimization of large-scale asynchronous system," In Proc. ACM/IEEE Des. Autom. Conf., 2002, pp. 405-410.

Constantinescu, C., "Trends and challenges in VLSI circuit reliability," IEEE Micro, 2003, 23(4):14-19.

Cortadella, J., "Decomposition and technology mapping of speed-independent circuits using Boolean relations," IEEE Trans. Computer-Aided Des. Integr. Circuits Syst., 1999, 18(9):1221-1236.

Cortadella, J et al. "Petrify: A tool for manipulating concurrent specifications and synthesis of asynchronous controllers," IEICE Trans. Information and Systems, 1997, E80-D:315-325.

Cortadella, J. et al. "Coping with the variability of combinational logic delays," In Proc. Int. Conf Computer Design, 2004, pp. 505-508.

David, I. et al. "An efficient implementation of boolean functions as self-timed circuits," IEEE Trans. Comput., 1992, 41(1):2-11.

Folco, B. et al. "Technology mapping for area optimized quasi delay insensitive circuits," In Proc. IFIP Conf. Very Large Scale Integration Systems, 2005.

Ho, Q. T. et al. "Implementing asynchronous circuits on LUT based FPGAs," In Proc. Int. Symp. Field Programmable Logic and Applications, 2002, pp. 36-46.

James, K. W. et al. "Average-case optimized transistor-level technology mapping of extended burst-mode circuits," In proc. Int. Symp. Asynchronous Circuits and Systems, 1998, pp. 70-79.

Jeong C. et al. "Optimal technology mapping and cell merger for asynchronous threshold circuits," In Proc. Int. Symp. Asynchronous Circuits and Systems, 2006, pp. 128-137.

Jeong et al. "Optimization of robust asynchronous circuits by local input completeness relaxation," In Asia and South Pacific Des. Autom. Conf., 2007.

Keutzer, K. "DAGON: Technology binding and local optimization by DAG matching," In Proc. Des. Autom. Conf., 1987, pp. 341-347.

Kondratyev, A. et al. "Logic decomposition of speed-independent circuits," Proc. IEEE, 1999, 87(2):347-362.

Kondratyev, A. et al. "Design of asynchronous circuits using synchronous CAD tools," IEEE Design & Test of Computers, 2002, 19(4):107-117.

Kondratyev, A. et al. "Checking delay-insensitivity: $10^4$ gates and beyond," In Proc. Int. Symp. Asynchronous Circuits and Systems, 2002, pp. 149-157.

Kudva, P. et al. "Synthesis of hazard-free customized CMOS complex-gate networks under multiple-input changes," In Proc. ACM/IEEE Des. Autom. Conf., 1996, pp. 77-82.

Kukimoto, Y. et al. "Delay-optimal technology mapping by DAG covering, " In Proc. ACM/IEEE Des. Autom. Conf., 1998, pp. 348-351.

Ligthart, M. et al. "Asynchronous design using commercial HDL synthesis tools," In Proc. Int. Symp. Asynchronous Circuits and Systems, 2000, pp. 114-125.

Martin, A. "Compiling communicating processes into delay-insensitive VLSI circuits," Distributed Computing, 1986, 1(4).

Martin, A. J. "The limitations to delay-insensitivity in asynchronous circuits," Technical Report Caltech-CS-TR-90-02, Department of Computer Science, California Institute of Technology, 1990.

McCardle J. et al. "Measuring an asynchronous processor's power and noise," In Proc. Synopsys User Group Conference, 2001.

Rudell, R. L. "Logic Synthesis for VLSI Design," PhD thesis, UCB/ERL M89/49, Electronics Research Laboratory, University of California at Berkeley, 1989.

Siegel, P. "Decomposition methods for library biding of speed-independent asynchronous designs," In Proc. IEEE/ACM Int. Conf. Computer-Aided Design, 1994, pp. 558-565.

Siegel, P. et al. "Automatic technology mapping for generalized fundamental-mode asynchronous designs," In Proc. ACM/IEEE Des. Autom. Conf., 1993, pp. 61-67.

Singh, N. P. "A design methodology for self-timed systems," Technical Report MIT/LCS/TR-258, Laboratory for Computer Science, MIT, 1981, Master's thesis.

Smith, S. C. et al. "Optimization of NULL convention self-timed circuits," Integration, the VLSI Journal, 2004, 37:135-165.

Sobelman, G. E. et al. "CMOS circuit design of threshold gate with hystersis," In Proc. Int. Symp. Circuits Systems, 1998, pp. 61-64.

Spars, J. et al. "Design of delay insensitive circuits using multi-ring structures," In Proc. European Des. Autom. Conf., 1992, pp. 15-20.

Van Berkel, C. H. et al. "Scanning the technology: Applications of asynchronous circuits," Proc. IEEE, 1999, 87(2):223-233.

Van Berkel, K. et al. "Stretching quasi delay insensitivity by means of extended isochronic forks," In Proc. Int. Symp. Asynchronous Circuits and Systems, 1995, pp. 99-106.

Van Berkel, K. et al. "VLSI programming of asynchronous circuits for low power," Asynchronous Digital Circuit Design, 1995, pp. 151-210.

Wegener, I. "The Complexity of Boolean Functions," John Wiley & Sons, and B. G. Teubner, 1987.

Yun, K. Y. et al. "Automatic synthesis of 3D asynchronous state machines," In Proc. IEEE/ACM Int. Conf. Computer-Aided Design, 1992, pp. 576-580.

Zhou, Y. et al. "Cost-aware synthesis of asynchronous circuits based on partial acknowledgement," In Proc. IEEE/ACM Int. Conf Computer-Aided Design, 2006.

De Micheli, G, *Synthesis and Optimization of Digital Circuits*, McGraw Hill, 1994.

Fant, K. M., *Logically-Determined Design*. John Wiley & Sons, 2005.

Fuhrer, R. M,. and Nowick, S. M., *Sequential Optimization of Asynchronous and Synchronous Finite-State Machines: Algorithms and Tools*, Kluwer Academic Publishers, 2001.

Muller, D.E., "Asynchronous logics and applications to information processing," In H. Aiken and W. F. Main, editors, *Switching Theory in Space Technology*, pp. 289-297, Stanford University Press, 1963.

Seitz, C. L. System timing. In C. A. Mead and L. A. Conway, editors, *Introduction to VLSI Systems*, chapter 7. Addison-Wesley, 1980.

Smith, S.C. et al., "Delay-Insensitive Gate-level Pipelining," *Integration, The VLSI Journal*, vol. 30, No. 2, Nov. 2001.

* cited by examiner

1010

*CellPatternGeneration(L)*

```
1   //-- do iteration 1
2   for (each cell c_i in library L)
3   do add {c_j ∈ L : c_i ≡ c_j} as pattern graphs of c_i
4   //-- do iteration 2
5   T ← ∅        // temporary cell merger
6   for (each cell pair (c_i, c_j) in library L)
7   do for (each cell merger m ∈ ⟨c_i, c_j⟩)
8      do if (m ≡ c_k for some k)
9         then add m as a pattern of c_k
10        else T ← T ∪ {m}
11  //-- do iteration 3
12  for (each cell pair (c_i ∈ L ∪ T, t_j ∈ T))
13  do for (each cell merger m ∈ ⟨c_i, t_j⟩)
14     do if (m ≡ c_k for some k)
15        then add m as a pattern of c_k
```

FIG. 10

| 1-rail ($a_1$) | 0-rail ($a_0$) | 3NCL signal ($a$) |
|---|---|---|
| 1313 — 0 | 1313 — 0 | 1313 — NULL |
| 1314 — 0 | 1314 — 1 | 1314 — 0 |
| 1315 — 1 | 1315 — 0 | 1315 — 1 |
| 1316 — 1 | 1316 — 1 | 1316 — not allowed |

METHODS AND MEDIA FOR FORMING A BOUND NETWORK

CROSS-REFERENCE TO RELATED APPLICATION

This application claims the benefit under 35 U.S.C. §119 (e) of U.S. Provisional Patent Application No. 60/764,700, filed Feb. 1, 2006, and U.S. Provisional Patent Application No. 60/772,945, filed Feb. 14, 2006, each of which is hereby incorporated by reference herein in its entirety.

STATEMENT REGARDING GOVERNMENT SPONSORED RESEARCH

The invention disclosed herein was made with U.S. Government support from the DARPA CLASS Program and the NSF ITR under number NSF-CCR-0086036. Accordingly, the U.S. Government may have certain rights in this invention.

TECHNOLOGY FIELD

The disclosed subject matter relates to methods and media for forming a bound network.

BACKGROUND

A logic network can be represented, for example, as a directed acyclic graph of vertices and edges, where the vertices are partitioned into primary inputs, primary outputs, and internal vertices. A Boolean function can be associated with each internal vertex in a logic network. A Boolean function, f, with n inputs and m outputs can be defined as a mapping f: $B^n \rightarrow B^m$, where B can have the value 1 or 0. Input values of the logic network can be set on to the primary inputs and processed by the internal vertices. Calculated output values of the logic network can be produced at the primary outputs. Logic networks can be defined using various notations, such as, for example, using Boolean equations, hardware description languages, specifications, netlists, logic diagrams, binary decisions diagrams (BDDs) and/or truth tables.

The description of a logic network can be unbound (i.e., be technology-independent) or bound (i.e., be made of components that are instances of a given technology library). Typically, logic networks are first described using an unbound notation. However, for example, to actually make a circuit or test certain properties of a prospective circuit, the logic network typically needs to be bound to a given technology library. Technology mapping can transform an unbound logic network to a bound network. Various systems and methods exist to perform technology mapping and these systems and methods can be included in, for example, computer automated design (CAD) tools.

Logic networks and/or circuits can be designed to be, for example, asynchronous or synchronous. Unlike a synchronous circuit, an asynchronous circuit component is not governed by a clock circuit or global clock signal. Instead, the component waits for a signal or signals that indicate completion of instructions and operations. Some networks and/or circuits can be entirely asynchronous or entirely synchronous, while others can include both asynchronous and synchronous components and these components can communicate.

One issue in circuit design and technology mapping is the presence of timing hazards. Timing hazards can be caused by the timing delay of different components (e.g., logic gates, latches, multiplexers, etc.) in a circuit. When certain paths through a circuit allow a variable-change to propagate faster than other paths, a timing hazard may result. For example, if a logic gate accepts two inputs (e.g., input one and input two) and a new value for input one arrives before the corresponding new value for input two arrives, the gate output may change to reflect the arrival of input one, despite the fact that other gates leading to input two have not yet stabilized. As a result, the output of the logic gate will change before the entire sub-circuit leading to input two has stabilized. In this case, input two will not be observed by the gate, and later changes on input two may eventually cause incorrect values to appear on the gate output.

Avoiding and/or removing timing hazards can be a challenge in synchronous CAD flows, especially as, for example, process, temperature, and voltage variations increase in deep submicron designs. One approach to address this challenge is the use of robust asynchronous circuits that can accommodate timing discrepancies. Asynchronous designs can reduce power consumption, reduce electromagnetic interference, improve robustness to parameter variations, and provide modularity of design. However, there is insufficient CAD support for timing-robust asynchronous designs.

Challenges in designing and optimizing asynchronous threshold circuits include, for example, reducing size, reducing area, and/or ensuring timing-robust implementations. In attempting to address some of these challenges, a circuit designer attempts to be careful to not introduce problems, such as, for example, timing hazards. In both synchronous and asynchronous synthesis flows, technology mapping can be especially important because it can be among the first times, in a design process, where optimization is performed with realistic cost parameters of a target technology.

SUMMARY

Methods and media for forming a bound network are provided. In some embodiments, methods for forming a bound network are provided. The methods include: decomposing an asynchronous input network to form a network of base functions, wherein the network of base functions includes simple base functions that include two-input threshold OR functions and two-input threshold AND functions with hysteresis, and complex base functions generated during the decomposing; partitioning the network of base functions into at least one subject graph, each portion of the at least one subject graph having a function; determining matches between the at least one subject graph and one or more pattern graphs; and selecting at least one of the one or more pattern graphs to be used in the bound network for the function of each of different portions of the at least one subject graph.

In some embodiments, methods for forming a bound network are provided. The methods include: partitioning an asynchronous logic network into at least one subject graph, each having a root function; determining matches between different portions of the at least one subject graph and one or more pattern graphs; and selecting at least one of the one or more pattern graphs to be used in the bound network for the root function of each of the at least one subject graph.

In some embodiments, computer-readable media containing computer-executable instructions that, when executed by a processor, cause the processor to perform methods for forming a bound network, are provided. The methods include: decomposing an asynchronous input network to form a network of base functions, wherein the network of base functions includes simple base functions that include two-input threshold OR functions and two-input threshold AND functions with hysteresis, and complex base functions generated during the decomposing; partitioning the network of base functions into at least one subject graph, each portion of the at least one subject graph having a function; determining matches between the at least one subject graph and one or more pattern graphs; and selecting at least one of the one or more pattern graphs to be used in the bound network for the function of each of different portions of the at least one subject graph.

In some embodiments, computer-readable media containing computer-executable instructions that, when executed by a processor, cause the processor to perform methods for forming a bound network, are provided. The methods include: partitioning an asynchronous logic network into at least one subject graph, each having a root function; determining matches between different portions of the at least one subject graph and one or more pattern graphs; and selecting at least one of the one or more pattern graphs to be used in the bound network for the root function of each of the at least one subject graph.

BRIEF DESCRIPTION OF THE DRAWINGS

FIG. 10 is a simplified illustration of a method for cell pattern generation in accordance with some embodiments of the disclosed subject matter.

FIG. 13 is an illustration of 3NCL encoding that can be used in accordance with some embodiments of the disclosed subject matter.

DETAILED DESCRIPTION

Methods and media for forming a bound network are provided. Some embodiments of the disclosed subject matter can transform a technology-independent logic network into a bound network (e.g., an interconnection of components that are instances of a given technology library). Some embodiments can transform a bound network into another bound network. Some embodiments of the disclosed subject matter can improve, for example, either the size or speed of a logic network. In some embodiments, a logic network can be a directed acyclic graph (G) containing vertices (V) and edges (E). Vertices can include, for example, primary inputs, primary outputs, and internal vertices. Each internal vertex can be associated with a Boolean function.

Figure 1:
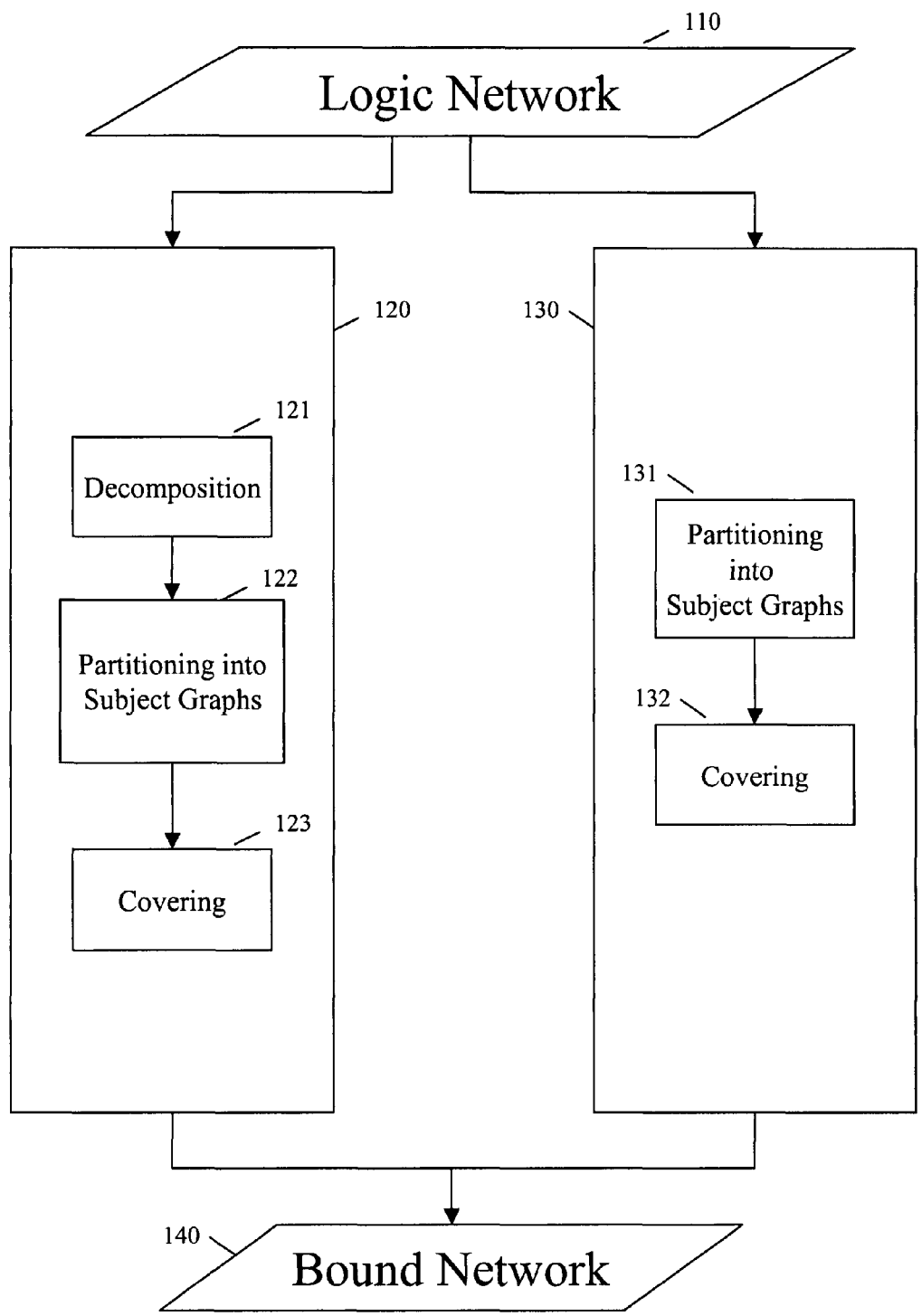
FIG. 1 is a simplified illustration of two methods for producing a bound logic network from a logic network in accordance with some embodiments of the disclosed subject matter.

As shown in FIG. 1, some embodiments can perform the transformation of a logic network 110 (which can be unbound or bound), at 120, to a bound network 140. In such embodiments, 120, can include, for example, decomposition, at 121, partitioning, at 122, and covering, at 123. Decomposition, at 121, can decompose a given logic network into an equivalent decomposed network where the gates can be broken into smaller pieces called base functions. Various functions can be used as base functions, for example, some embodiments can use NANDs and NOTs as base functions. Partitioning, at 122, can be used to partition the decomposed logic network into sub-networks called subject graphs (e.g., portions of the logic network 110 represented using base functions). Partitioning can be performed, for example, at points in a decomposed logic network where a gate has multiple fan-outs. Covering, at 123, can match subject graphs with cells from a technology library.

Figure 2:
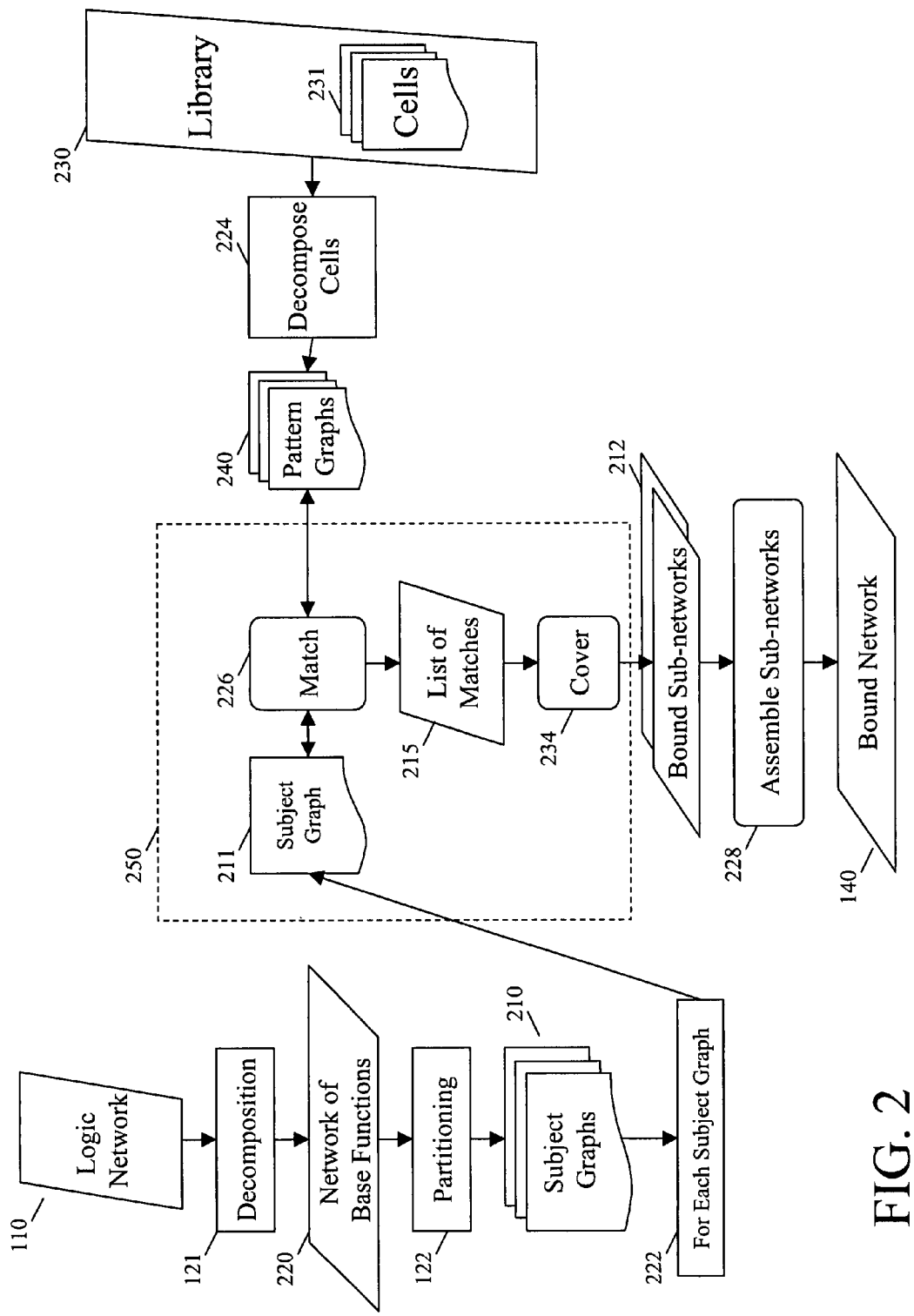
FIG. 2 is a simplified illustration of a method for producing a bound logic network from a logic network in accordance with some embodiments of the disclosed subject matter.

For example, FIG. 2 illustrates a system and method in accordance with some embodiments of the methods of FIG. 1. The logic network 110 can be decomposed, at 121, into a network of base functions 220. The network of base functions 220 can be partitioned, at 122, to form subject graphs 210. Cells 231 from a library 230 can be decomposed, at 224, into pattern graphs 240 (e.g., base function representations of cells 231). A subject graph 211 can be selected, at 222, from the subject graphs 210, until all of the subject graphs 210 are processed, at 250. Base functions and/or groups of base functions of subject graph 211 can be matched, at 226, with pattern graphs of pattern graphs 240 to create a list of matches 215. Covering, at 234, can determine which of the matches in list 215 will be used to cover the base functions and/or groups of base functions in subject graph 211 to produce a bound sub-network of network 110. Bound sub-networks 212 (generated at 250 for each of the subject graphs 210) can be assembled, at 228, to produce a bound network 140. A bound network 140 can be used to manufacture a circuit device, wherein the circuit device can be, for example, an integrated circuit, a hybrid integrated circuit, a processor, a controller, and/or a memory (e.g., cache, RAM, ROM, PROM, EPROM, EEPROM, flash memory).

Returning to FIG. 1, alternatively, some embodiments can perform the transformation of a logic network 110 to produce a bound network 140. As illustrated, the logic network 110 can be partitioned into subject graphs, at 131. The vertices of the subject graphs can be matched, at 132, with pattern graphs of a technology library until the entire subject graph is covered by pattern graphs.

Figure 3:
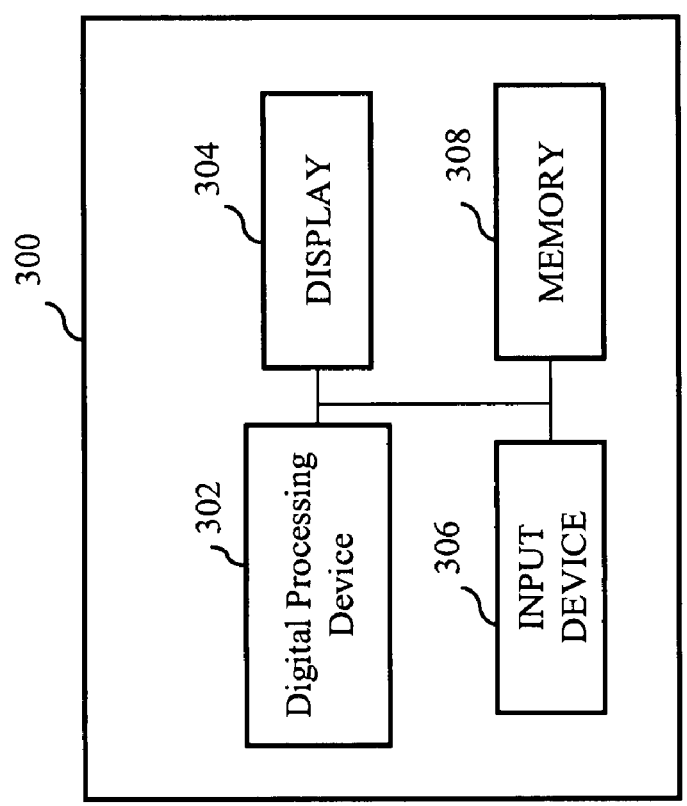
FIG. 3 is an illustration of a digital data processing device that can be used in accordance with some embodiments of the disclosed subject matter.

FIG. 3 illustrates a system 300 that can be used with some embodiments of the disclosed subject matter. System 300 can include, among other things, digital processing device 302, display 304, input device 306, and memory 308, which can be interconnected. Digital processing device 302 can be, for example, a processor, a digital signal processor, a controller, etc. In some embodiments, memory 308 contains a program for controlling digital processing device 302. Memory 308 can also contain applications for performing the methods described herein, for example, the methods illustrated in FIG. 1. In some embodiments, various other applications can be resident in the memory 308. In some embodiments system 300 can include additional components, for example, additional input devices. In some embodiments various systems 300 can be interconnected and/or connected with other devices.

Some embodiments of the disclosed subject matter can operate on, for example, Null Convention Logic (NCL), which is a circuit implementation style for asynchronous threshold networks that uses delay insensitive encoding of a data-path in which data communication alternates between set and reset phases. In NCL, data can change from a spacer (called NULL) to a proper codeword (called DATA) in a set phase and change back to NULL in a reset phase.

Some embodiments of the disclosed subject matter can use a particular form of NCL called 3NCL, which is a three-valued logic with symbolic values {0, 1, N}. Of the three values, 0 and 1 represent valid data and N represents NULL. A 3NCL gate appears similar to a Boolean gate, but can alternate between set and reset phases. The input signals and the output signal of a 3NCL gate can be initialized to N. When all of the inputs have valid data values (i.e., 0 or 1), the output can change to a correct data value. For example, the output of a 3NCL OR gate changes to a 0 or 1 value only after all the inputs have changed to data values (i.e., 0 or 1). In the reset phase, the output of a 3NCL gate maintains its data value until all the inputs are reset to N, which causes the output to change to N.

A 3NCL circuit can be implemented using binary-valued Boolean circuits. For example, a 2NCL circuit, which can also be used in some embodiments, is a binary-valued implementation of a 3NCL circuit based on dual-rail encoding of 3NCL signals. Dual-rail encoding of each three-valued 3NCL signal can be achieved, for example, by using two 2NCL signals. Various encoding from 3NCL to 2NCL can be used. For example, FIG. 13 illustrates a table 1310 describing one way in which 3NCL signals can be encoded to 2NCL signals. According to the mapping of table 1310, if both the values of the 0-rail 1311 and the 1-rail 1312 are 0, the 3NCL value is NULL (i.e., invalid data), at row 1313. If the value of the 0-rail 1311 is 1 and the value of the 1-rail 1312 is 0, the 3NCL value is 0, at row 1314. If value of the 0-rail 1311 is 0 and value of the 1-rail 1312 is 1, the 3NCL value is 1, at row 1315. A value of 1, at row 1316, on both the 0-rail 1311 and the 1-rail 1312 is not allowed.

Various systems and/or methods can be used to implement a 3NCL gate using dual-rail encoding, such as, for example, NCL-style expansion or Delay-Insensitive Minterm Synthesis (DIMS). With DIMS-style expansion, for example, each single variable (or bit) is mapped to a dual-rail Boolean equivalent and the Boolean function associated with the 3NCL gate is implemented as a network of complex minterms (e.g., C-elements, which are gates for which the output reflects the inputs when the states of all inputs match and where the output remains in that state until the inputs all transition to the other state.) feeding into OR-gates for 0-rail and 1-rail outputs.

Figure 14:
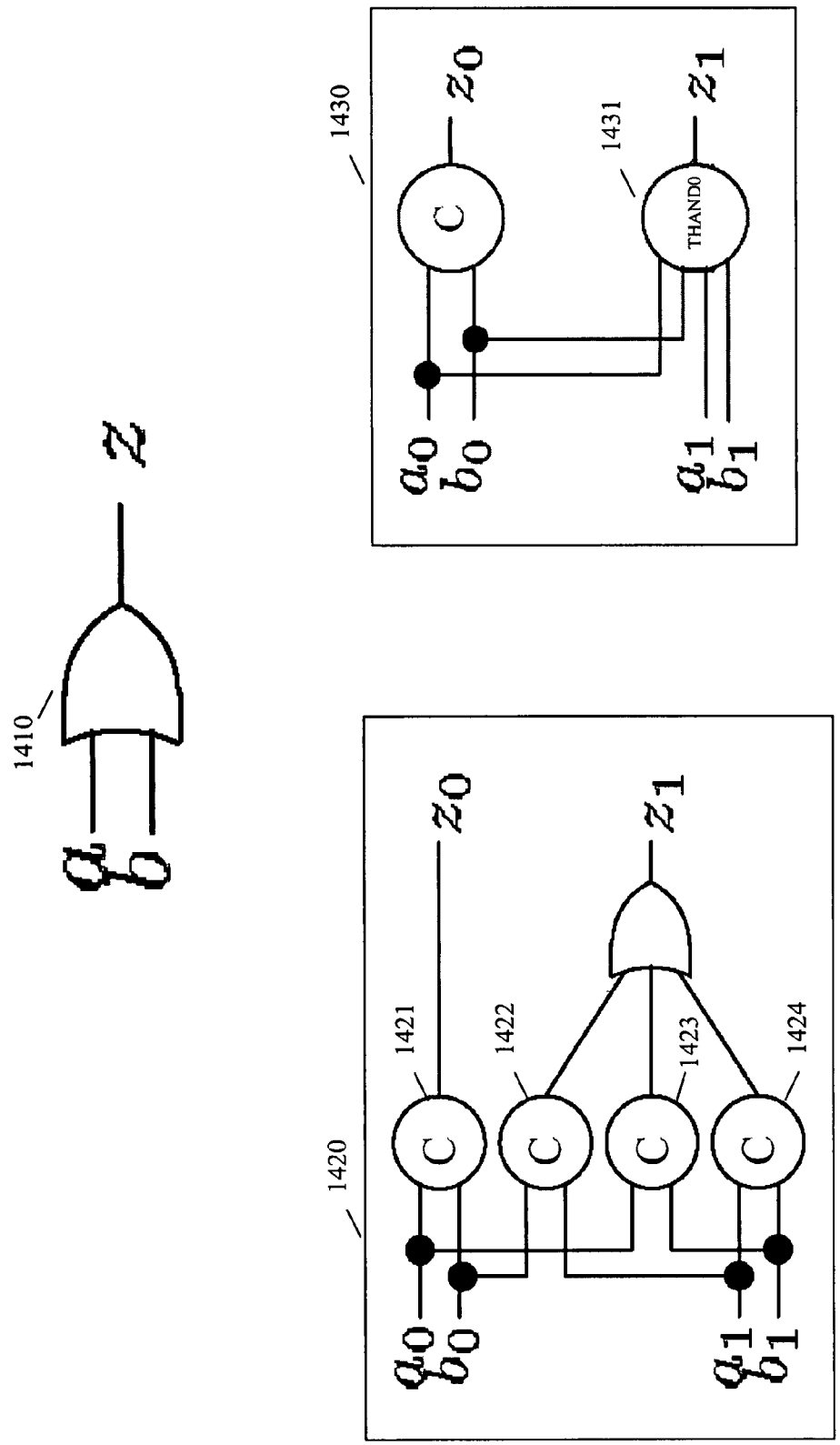
FIG. 14 is an illustration of a 3NCL gate expanded in two styles that can be used in accordance with some embodiments of the disclosed subject matter.

FIG. 14 illustrates a 3NCL gate, 1410, dual-rail expanded into a network of 2NCL gates in DIMS-style, at 1420, and NCL-style, at 1430. In DIMS-style expansion, at 1420, the two-input 3NCL OR gate 1410, with inputs "a" and "b," and one output "z," is transformed into a network with four inputs, $a_0, a_1, b_0$, and $b_1$ and two outputs, $z_0$ and $z_1$. The wires $a_0, b_0, z_0$ represent the 0-rails of a, b, and z, and the wires $a_1, b_1$, and $z_1$, represent the 1-rails of a, b, and z. Each C-element 1421-1424 can detect a distinct input combination or minterm.

In an NCL-style expansion, illustrated at 1430, a further optimization and/or improvement can be performed on the DIMS-style expansion. A subnetwork for each of the 0-rail and the 1-rail can be substituted with a single complex cell. For example, the 1-rail logic for a 3NCL OR gate can implemented using a four-input complex gate THAND0 1431, which can implement the function $a_0b_1+a_1b_0+a_1b_1$. To obtain a 2NCL circuit from a 3NCL circuit, each gate of the 3NCL circuit can be visited in topological order, from primary inputs to primary outputs, and can be replaced with a corresponding network of 2NCL gates.

A 2NCL circuit can be mapped using NCL threshold gates with hysteresis, which are defined in, for example, an NCL technology library. NCL threshold gates with hysteresis are sequential (i.e., not combinational). In some embodiments, once the gate is set, the output does not change until the full reset condition occurs, and once it is reset, the output does not change until the full set condition occurs. The set function of an NCL threshold gate with n inputs $x_i, \ldots, x_n$ can implement a threshold function S. A reset function of an NCL threshold gate can be $R=\overline{x_1+\ldots+x_n}$. The threshold function $S(x_1, \ldots, x_n; w_1, \ldots, w_n; T)$ can be characterized by a weight vector $\vec{w}=(w_1, \ldots, w_n)$ and a threshold value $T \in R$, where $S(x_1, \ldots x_n; \vec{w}; T)=1$ if and only if $\Sigma_{1 \leq i \leq n} w_i \cdot x_i \geq T$. In NCL threshold gates, threshold values and weight functions can be restricted to being positive integers. In some embodiments, NCL threshold gates can be considered as a form of generalized C-elements.

For example, a two-input C-element, with inputs $x_1$ and $x_2$, has a set function $S(x_1,x_2; 1,1; 2)$, indicating that each input has a weight of 1, and the threshold is 2. For this example, the reset function is $R=\overline{x_1+x_2}$, indicating that both inputs must be reset before the output can be reset.

In some cases, 2NCL gates can be referred to based solely on their (combinational) set functionality. For example, a 2NCL "AND" gate can refer to an NCL sequential threshold gate whose set function is $S(x_1, x_2; 1,1; 2)=x_1 \cdot x_2$ and whose reset function is $R=\overline{x_1+x_2}$. Thus, in some embodiments, 2NCL AND gates can be essentially the same as C-elements. Similarly, a 2NCL "OR" gate can be an NCL threshold gate whose set function is $S(x_1,x_2; 1,1; 1)=x_1+x_2$ and whose reset function is $R=\overline{x_1+x_2}$.

One issue in designing and optimizing asynchronous threshold networks is avoiding timing hazards. For example, suppose an NCL circuit is in a reset state where all the wires have 0 values. Once all the input data arrives and all the circuit outputs are computed, in some embodiments, there must be at least one path from a primary input to a primary output where all the signal transitions are from 0 to 1. The events on each such path are an example of a signal transition sequence. A signal transition $s_2$ is said to acknowledge a signal transition $s_1$ if $s_1$ always precedes $s_2$ in any possible signal transition sequence in a set phase of an NCL circuit. In some embodiments, a signal transition is unacknowledged if it is not acknowledged by some signal transition on a primary output.

An unacknowledged signal transition sequence, which takes place after an output of a circuit has changed, can be referred to as an orphan. An orphan can arise when a signal transition on either a wire or a gate in the circuit is unobservable, and may cause a circuit malfunction if, for example, the transition is too slow. Introduction of an orphan into a circuit can cause spurious signal transitions. For example, if an output of an NCL circuit changes as a result of a set of inputs, it may be assumed that the circuit is done responding to that set of inputs. As such, the circuit may enter a reset phase. However, if a signal is still propagating through the circuit after the circuit is reset, that signal many incorrectly cause an output to change. Orphans can include wire orphans and gate orphans. A wire orphan is an unacknowledged signal transition sequence that does not run through a gate, and a gate orphan is an unacknowledged signal transition sequence that does run through a gate. Some embodiments of the disclosed subject matter can perform technology mapping without introducing, for example, gate orphans.

Figure 15:
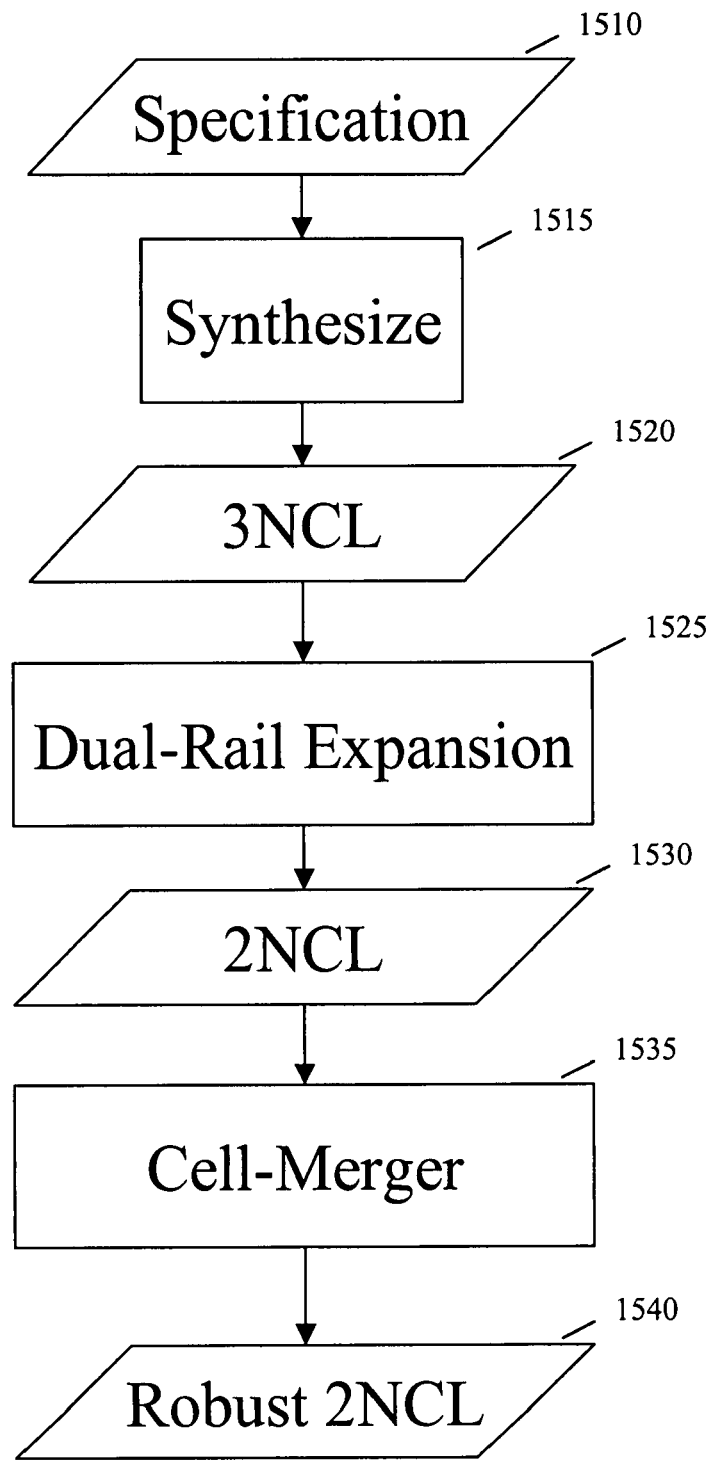
FIG. 15 is an illustration of an NCL synthesis that can be used in accordance with some embodiments of the disclosed subject matter.

Some embodiments of the disclosed subject matter are applicable to various asynchronous threshold circuit and/or synthesis flow. For example, some embodiments of the disclosed subject matter can function with the NCL synthesis illustrated in FIG. 15. A specification 1510 can be created, for example, using a hardware description language, such as, for example, Very High Speed Integrated Circuit Hardware Description Language (VHDL) or Verilog. The specification 1510 can be synthesized and optimized, at 1515, using various systems and/or methods, such as, for example, CAD tools, such as the Synopsys Design Compiler. The result can be a 3NCL circuit 1520, that is, for example, optimized and/or improved. While performing these optimizations and/or improvements, the 3NCL circuit can be treated as a standard Boolean circuit by CAD tools.

Figure 16:
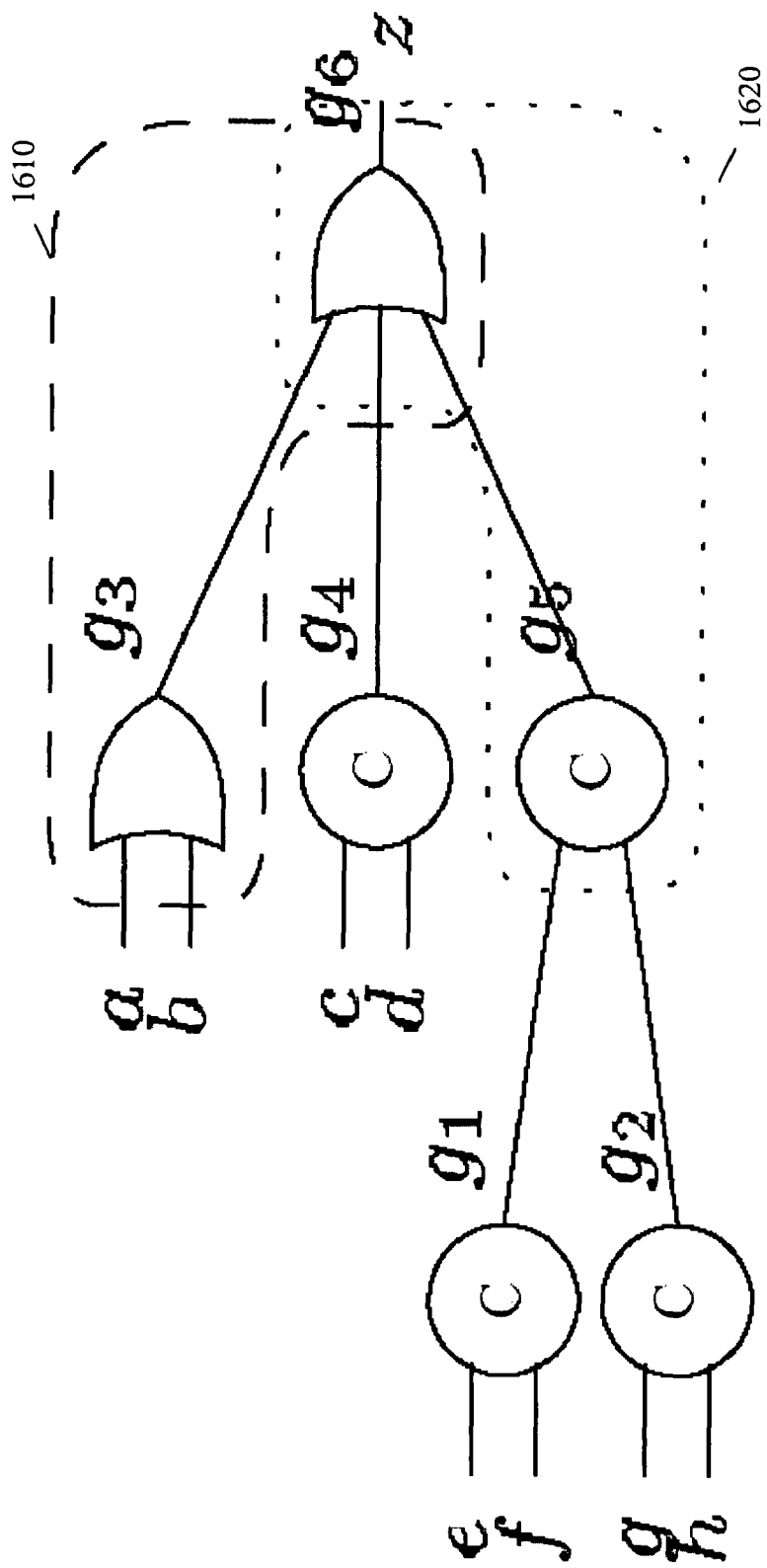
FIG. 16 is an illustration of a 2NCL circuit in accordance with some embodiments of the disclosed subject matter.

Each 3NCL gate in the 3NCL circuit 1520 can be individually macro-expanded into a dual-rail block, at 1525, to create a 2NCL circuit 1530. Various systems and/or methods for dual-rail expansion can be used, such as, for example, basic expansion and/or NCL-specific expansion. In some embodiments, the expansion, at 1525, can map the 3NCL circuit 1520 to a pre-defined cell library of 2NCL threshold gates 1530. Accordingly, in some embodiments, the 2NCL circuit 1530 can be a 2NCL circuit that is made of dual-rail 2NCL asynchronous threshold gates with hysteresis and that captures the desired functionality of a Boolean netlist. A cell merger process, such as, for example, a template-based cell merger process, can be applied to further optimize the 2NCL 1530 circuit, at 1535, to create another 2NCL circuit 1540 with some of its gates merged. The cell merger at 1535, identifies a restricted set of cell patterns and whenever any such pattern appears in an inputted logic network it can be replaced by the corresponding merged cell Some embodiments can merge cells of an NCL circuit to reduce and/or minimize delay and/or area. Some embodiments can assume that all cells in a circuit have one output and cell merger can be restricted to occur only on a sub-graph of the circuit that is a tree. In such embodiments, for example, this restriction can eliminate the possibility of having a cell merger with multiple outputs. Some embodiments can add internal signals while, for example, technology mapping (mapping a logic network to a bound logic network) speed-independent circuits so that the internals signals do not create hazards. For example, as illustrated in FIG. 16, in a 2NCL circuit with six gates, the cell g6 can be merged with other cells to reduce and/or minimize a cost function, such as area.

Using an NCL technology library, for example, g6 can be merged, with either g3, into a four-input OR cell 1610 or with g5 into a four-input threshold cell 1620 with set function $S(x_1,x_2,x_3,x_4; 2,2,1,1; 2)=x_1+x_2+x_3x_4$. However, if the cell g6 is merged with g5 into a four-input threshold cell, the chance of merging g5 with g1 and g2 into a four-input AND cell is lost. Thus, when merging g6 with other cells, an ad-hoc local decision may exclude an otherwise possible cell merger, possibly resulting in an inferior solution. Therefore, some embodiments can employ an approach with a global notion of optimality and/or improvement.

Turning back to FIGS. 1 and 2, in some embodiments an unbound logic network can be used as network 110. Alternatively, in some embodiments, however, a bound logic network such as, for example, network 1530 or 1540 (of FIG. 15) can be used as network 110.

Some embodiments can represent arbitrary threshold logic networks using positive monotonic threshold gates with integer weights using simple base functions. Such base functions can include, for example, to 2NCL cells, which implement positive integral threshold functions. For example, two threshold cells, (i) a two-input threshold OR function with hysteresis and (ii) a two-input threshold AND function with hysteresis, can be used as base functions. Two-input threshold OR functions can be combined to build up arbitrary 1-of-N threshold gates (i.e., OR-gates). Two-input threshold AND functions can be combined to build up arbitrary N-of-N threshold gates (i.e., C-elements).

Figure 4:
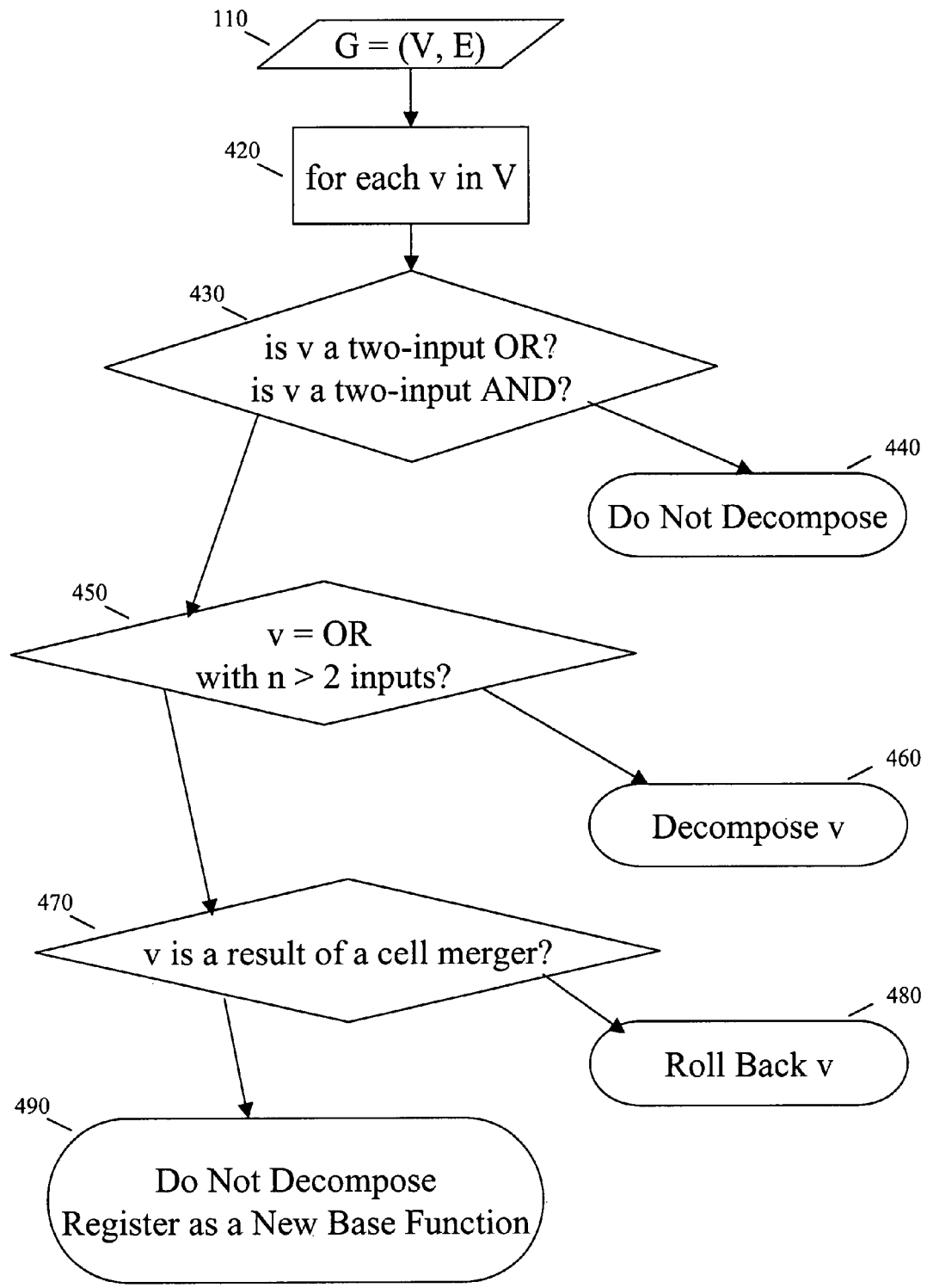
FIG. 4 is a simplified illustration of a method for gate-orphan-free decomposition in accordance with some embodiments of the disclosed subject matter.

FIG. 4 illustrates a gate-orphan-free decomposition process (which can be used, for example, at 121 of FIGS. 1 and 2) that can process, for example, logic network 110. As stated above, in some embodiments, network 110 can be, for example, a post-optimized 2NCL circuit (e.g., 1540 of FIG. 15). The network 110 can be traversed in topological order from the primary inputs to the primary outputs. Each vertex, selected at 420, can be evaluated and if it is determined at 430, that the vertex is either, for example, a two-input OR cell or a two-input AND cell, the vertex may not be further decomposed, at 440, because it already implements a base function. If it is determined at 450, that the vertex is an OR gate with more than two inputs the OR gate can be decomposed into a tree of two-input OR cells, at 460. If it is determined at 470 that the vertex resulted from a rule-based cell merger (e.g., 1535 of FIG. 15), the vertex can be reverse-mapped (i.e., the performance at 1535 can be undone), at 480, through backwards mapping by a lookup table. After 440, 460, 480, or 490, the next vertex of network 110 can be selected, at 420.

In some embodiments, when it is not possible or desirable to decompose a vertex with a guarantee of gate-orphan-freedom, the vertex is not be decomposed and the vertex function can be registered as a complex base function, at 490. Such a vertex can be referred to as "irreducible" or "not-reduced." For example, in some embodiments, a vertex (e.g. a 3-input AND gate) cannot be decomposed without the possibility of introducing timing hazards. Therefore, the vertex (e.g., the 3-input AND gate) may be added as a complex base function and used in a subject graph 211.

Figure 5:
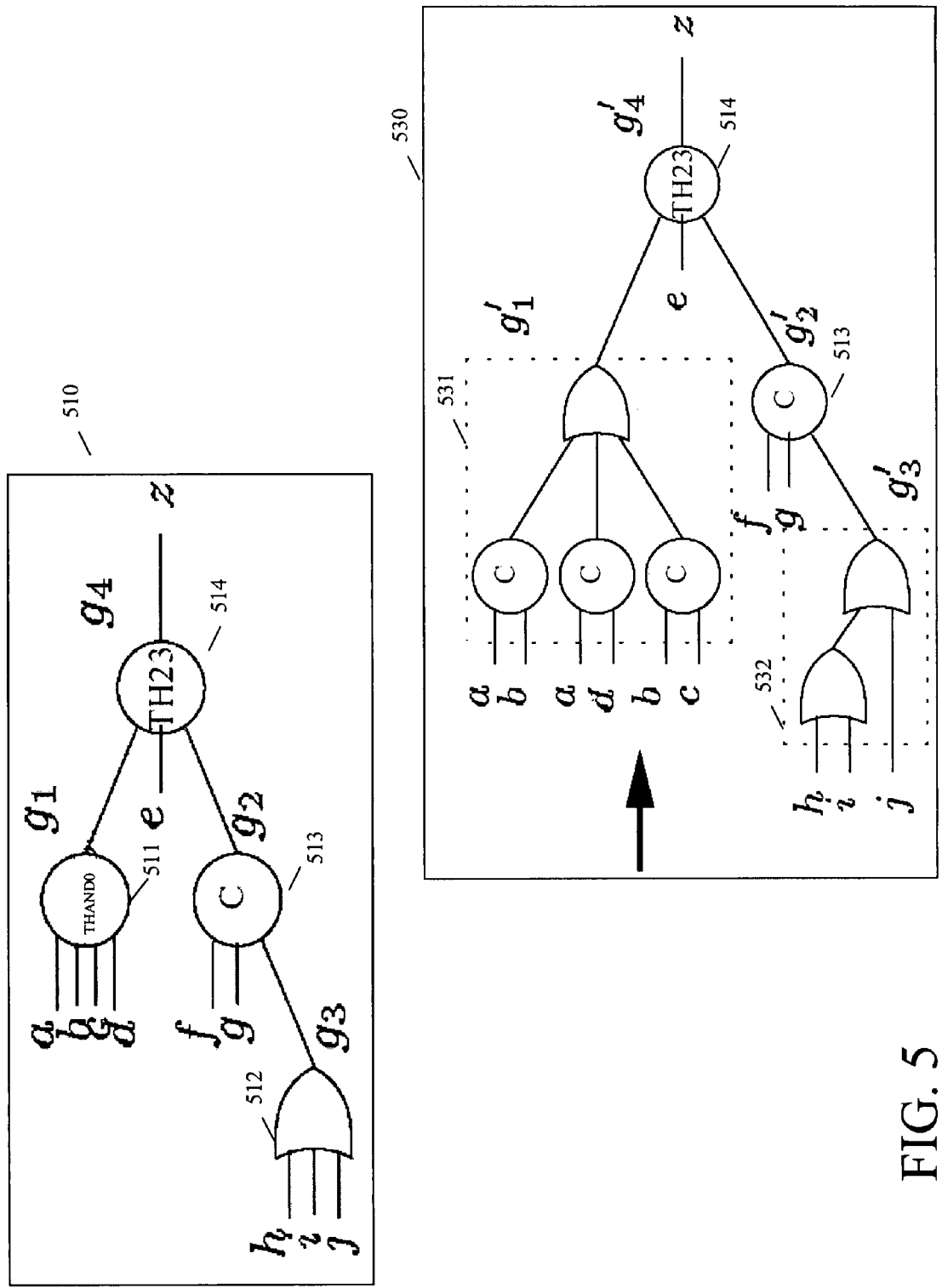
FIG. 5 is an illustration of two circuits illustrating gate-orphan-free decomposition in accordance with some embodiments of the disclosed subject matter.

FIG. 5 illustrates an example of a gate-orphan-free decomposition. As shown, a 2NCL circuit is illustrated, at 510, and its gate-orphan-free decomposition is illustrated at 530. The THAND0 gate 511 can be decomposed into a network of gates in box 531 and the 3-input OR gate 512 can be decomposed into two two-input OR gates as in box 532. In this example, the three-input C-element 513 and the TH23 gate 514 are not decomposed because the decomposition can introduce gate orphans. TH23 514 is a three-input complex cell which implements the function $x_1x_2+x_2x_3+x_3x_1$ (i.e., a majority function).

After decomposition, at 121, a network 220 comprised of simple base functions and possibly of complex base functions can be partitioned, at 122, into subject graphs 210. In some embodiments, it is possible that there is only one subject graph 210. In such embodiments, partitioning, at 122, is not performed because the network 220 is already a subject graph 211.

To generate pattern graphs (e.g., at 224) for cells in a library 230, some embodiments can use the two simple base functions (e.g., two-input threshold OR with hysteresis and two-input threshold AND with hysteresis). Each threshold cell in a library 230 can be decomposed into pattern graphs 240, each with a distinct structural pattern, to prepare for matching, at 226. In some embodiments, for example, the cells 231 can include sequential threshold gates and the finite basis (i.e., the set of available base functions) can include binary threshold cells (e.g., threshold OR with hysteresis and threshold AND with hysteresis).

Prior to forming pattern graphs, at 224, some embodiments can first generate trees for each cell using simple functions and complex irreducible functions. All possible trees constructed from these base functions can be enumerated and it can be checked whether any given tree implements the same function as the cell function. The space of generated trees can be bound by the condition that a pattern tree must have the same number of leaves as the number of input variables of the cell function. The trees that implement the same function as the cell function are designated as being pattern graphs 240 of FIG. 2.

In some embodiments, pattern graphs 240 of some cells can be represented as leaf-DAGs (a structure that is almost a tree, but where multiple inputs can be driven by the same signal). For example, a THAND cell of the NCL library can implement a Boolean function f=ac+ad+bc. This function can be represented by a leaf-DAG made of three two-input AND gates connected to two two-input OR gates.

Figure 6:
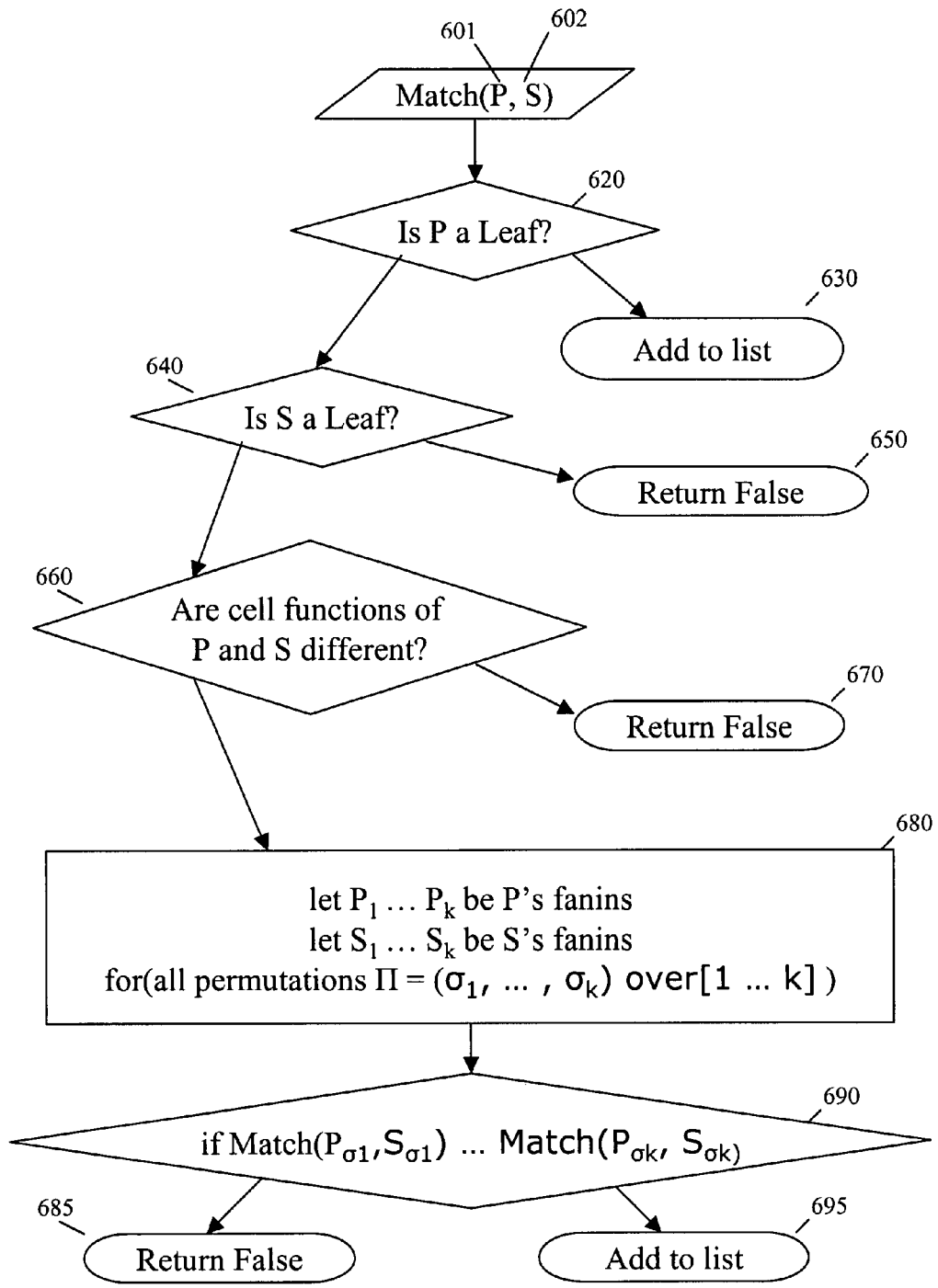
FIG. 6 is a simplified illustration of a method for matching pattern graphs with a subject graph in accordance with some embodiments of the disclosed subject matter.

FIG. 6 illustrates a matching process (e.g., 226 of FIG. 2) that can match a pattern graph 601 (e.g., of pattern graphs 240 of FIG. 2) with a subject graph 602 (e.g., subject graph 211). As shown, for example, it can be determined, at 620, whether the pattern graph 601 is a leaf. If so, P and S can be added to a list of matches 215 (FIG. 2), at 630. If not, it can be determined, at 640, whether the subject graph 602 is a leaf. If so, the process can return, at 650, without recording a match. If not, it can be determined, at 660, whether the cell functions of pattern graph 601 and portions at the root of the subject graph 602 are different. If so, the process can return, at 670, without recording a match. If not, each permutation of the fan-ins of the pattern graph 601 and fan-ins of the subject graph 602 in a recursive call to this matching process, at 680. If the recursively called process matches that permutation of P and S, it can add, at 695, P and S to a list of matches 215 (FIG. 2). If not, it can return, at 696, without recording a match. As a result, FIG. 6 can produce a list of matches 215 (FIG. 2) of pattern graphs 240 that can cover portions of the subject graph 602 at its root.

Covering, at 234 of FIG. 2, can determine what matches from the list of matches 215 to use. As part of this covering, dynamic programming can be used, and, for example, either area or delay cost improvement can be targeted. A nonlinear delay model based on table lookup can be used if delay cost improvement is targeted. Because the delay of a cell can partially depend on the output capacitance of the cell, a load binning technique can be used to find an optimal and/or improved solution. For example, for different possible output capacitances of a cell, different driving gates can be identified. After the fan-out loads of the cell are resolved, one of the different driving gates can be selected based on load. The output capacitance of the cell can be determined as the sum of the input capacitances of the input pins driven by this cell and the representative input capacitance values can be extracted from the library 230 and can be used for load binning. In some embodiments, for primary outputs, a default average output load value can be used.

Figure 7:
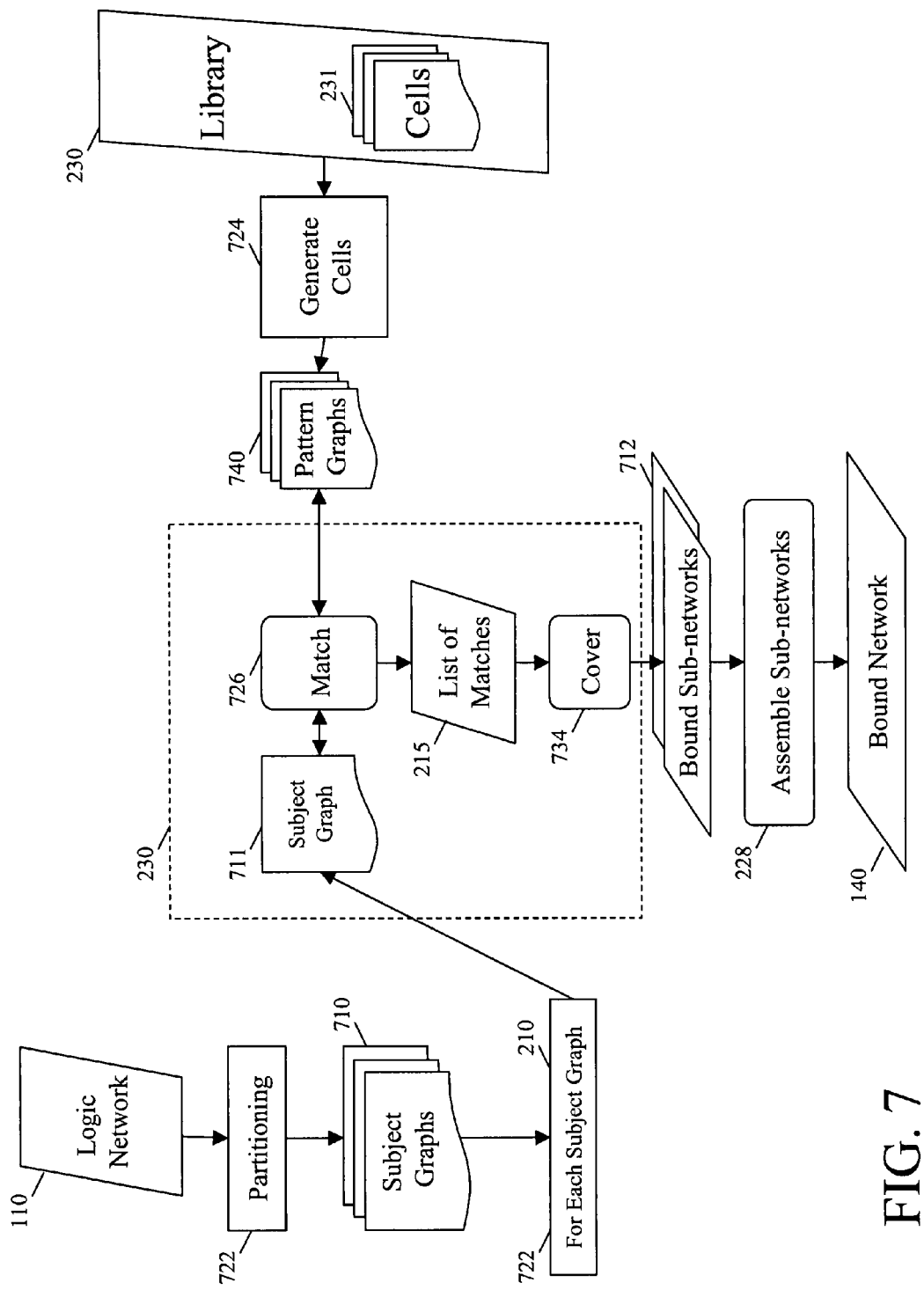
FIG. 7 is another simplified illustration of producing a bound logic network from a logic network in accordance with some embodiments of the disclosed subject matter.

Another approach to technology mapping is shown in FIG. 7. As illustrated in FIG. 7, a logic network 110 can be partitioned into subject graphs 710, at 722. The vertices of each subject graph can be structurally matched, at 726, with pattern graphs 740 of the cells 231 to form a list of matches 215.

Figure 8:
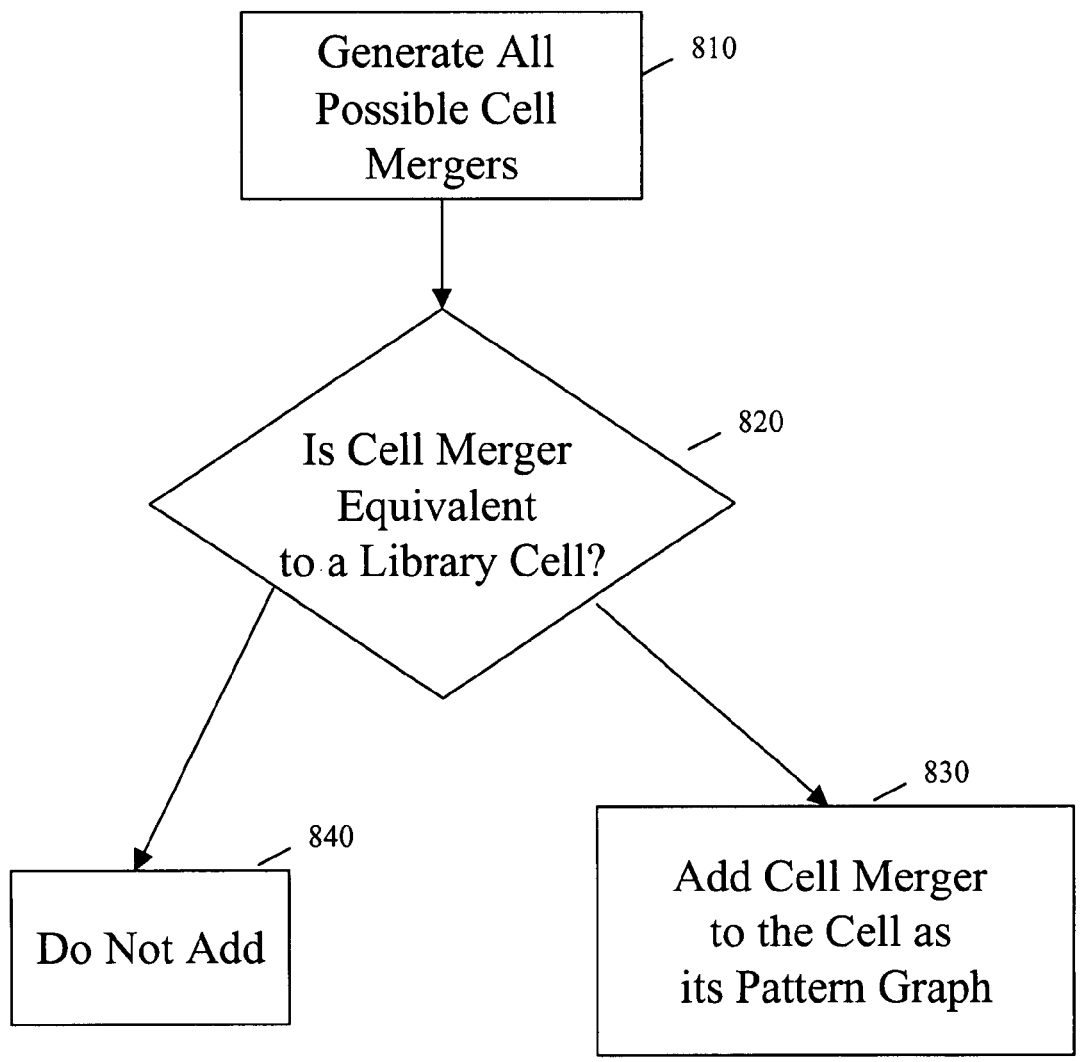
FIG. 8 is a simplified illustration of pattern graph generation in accordance with some embodiments of the disclosed subject matter.

FIG. 8 illustrates a method that can be used to generate (possibly simultaneously), at 724, the pattern graphs 740 for all library cells 231, in some embodiments. As shown, all possible cell mergers can be exhaustively generated, at 810, from the cells 231 and it can be checked, at 820, whether a generated cell merger is functionally equivalent to its library cell. If equivalent, the generated cell merger can be added, at 830, to the cell as pattern graph 740. If not, the cell merger is not added at 840. Some embodiments can iteratively find all mergers starting from, for example, one-cell merger, and continuing to larger cell mergers.

Figure 9:
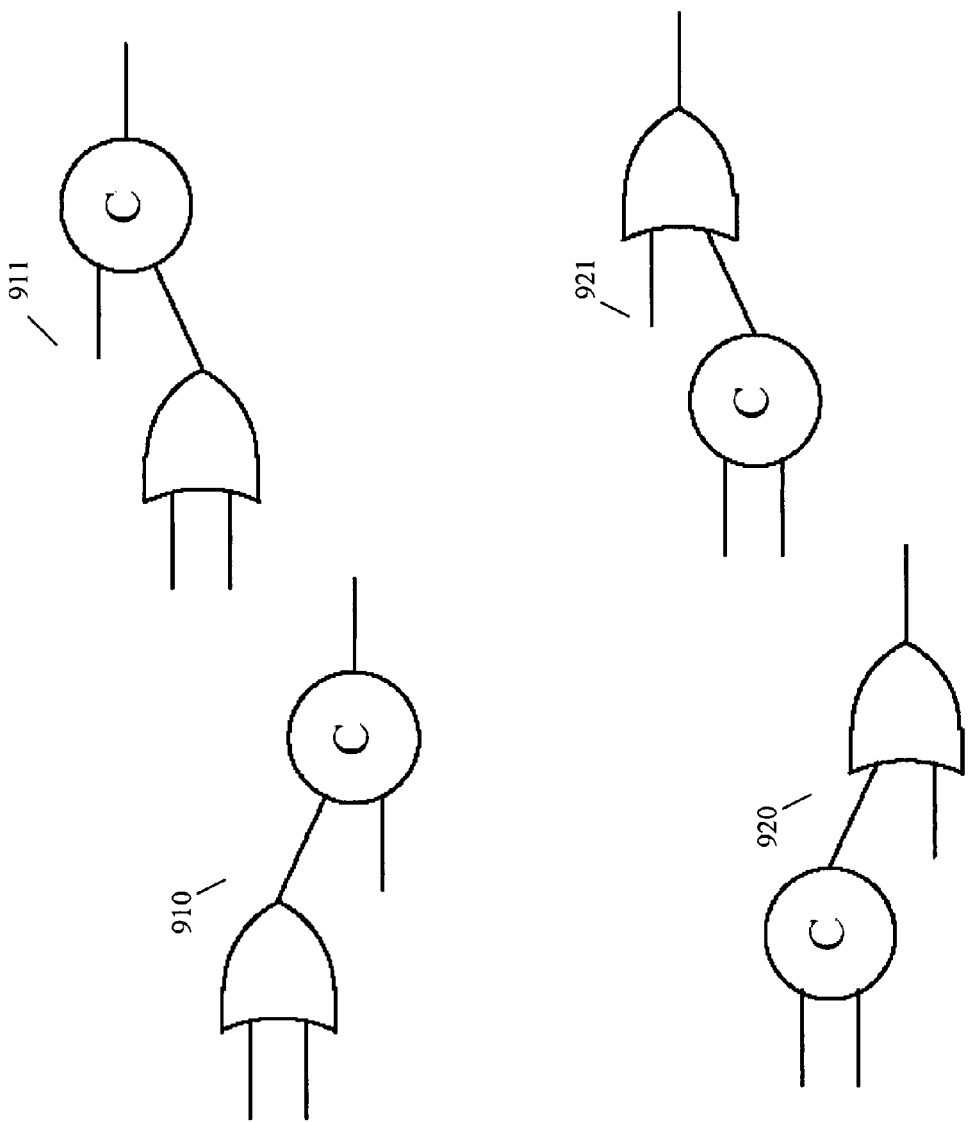
FIG. 9 is an illustration of possible cell mergers of a two-input OR cell and a two-input C-element in accordance with some embodiments of the disclosed subject matter.

FIG. 9 illustrates possible mergers that can be obtained by merging a two-input OR cell and a two-input C-element cell. Mergers 910 and 911 are functionally equivalent and mergers 920 and 921 are functionally equivalent. In some embodiments, only one merger for a functionally equivalent class of mergers is used in pattern generation, at 724 (FIG. 7). In some embodiments, such as, for example, when the root of a merger implements a non-symmetric function, distinguishing which input of the root cell is used for connecting the cells can be required.

An illustration of one embodiment of pattern graph generation is illustrated in FIG. 10, where $<c_i, c_j>$ denotes the set of all possible cell mergers of $c_i$ and $c_j$, as generated at 810 of FIG. 8. To determine functional equivalence ($\equiv$) of functions implemented by cell mergers, various systems and/or method can be used, such as, for example, BDD (binary decision diagram). At lines 2-3, it can be determined whether a cell ($c_i$) is functionally equivalent another cell ($c_j$) in the library. If so, $c_j$ can be added as a pattern graph of $c_i$. At lines 5-10, mergers of two cells 231 can be enumerated. When a cell merger is found to be equivalent to a library cell, it can be added as a pattern graph of the library cell. Otherwise, it can be added as a temporary cell merger. Though a temporary cell merger may not be a pattern graph of any library cell, in some embodiments, it may be used as part of a pattern graph formed later in pattern generation. In a third iteration, for example, at lines 12-15, mergers of three cells and four cells can be considered. For three-cell mergers, mergers of original cells and temporary cell mergers can be enumerated, and, for four-cell mergers, mergers of two temporary cell mergers can be enumerated.

In some embodiments, cell pattern generation may be computationally expensive and improvements, optimizations, and/or heuristics can be used to reduce computational overhead. For example, some embodiments may generate only up to mergers of four cells. In some embodiments, in order to reduce computational overhead, for example, only some of the possible three and/or four cells mergers may be generated. In iteration 2, when a cell merger m$\epsilon$($c_i$, $c_j$) is generated, for example, at line 7, the cell merger m either matches the library cell (line 9) and is added as a pattern graph for that library cell, or does not match the library cell and is added as a temporary cell merger to T (line 10). As seen in iteration 3 (lines 12-15), the mergers of the original cells 231 and the temporary cell mergers can be generated, but mergers of the cells 231 and the patterns that did match a cell above will not be generated. Instead, in some embodiments, the merger of the cells 231 and patterns can be handled by a matching process. This can allow reduction in the number of generated mergers and more efficient cell pattern generation. In some embodiments, rather than, for example, manipulating the cells 231 in enumerating cell mergers, cell functions can be merged, so that cells with the same cell function can be represented by a single functional equivalence class.

In some embodiments, cell pattern generation (e.g., 724 of FIG. 7 and/or 240 of FIG. 2) is executed only once for a library 230. Once pattern graphs 740 are generated, they can be, for example, exported to an file and reused later. In some embodiments, complete exhaustive pattern generation, without any heuristics, can be performed.

Once pattern graphs 740 have been formed as described above, the pattern graphs can be matched, at 726, against the subject graph 711. A matching process 726 can be extended so that rather than, for example, comparing a subject graph 711 and a pattern graph of pattern graph 740, a subject graph 711 and a set of pattern graphs 740 can be compared.

Figure 11:
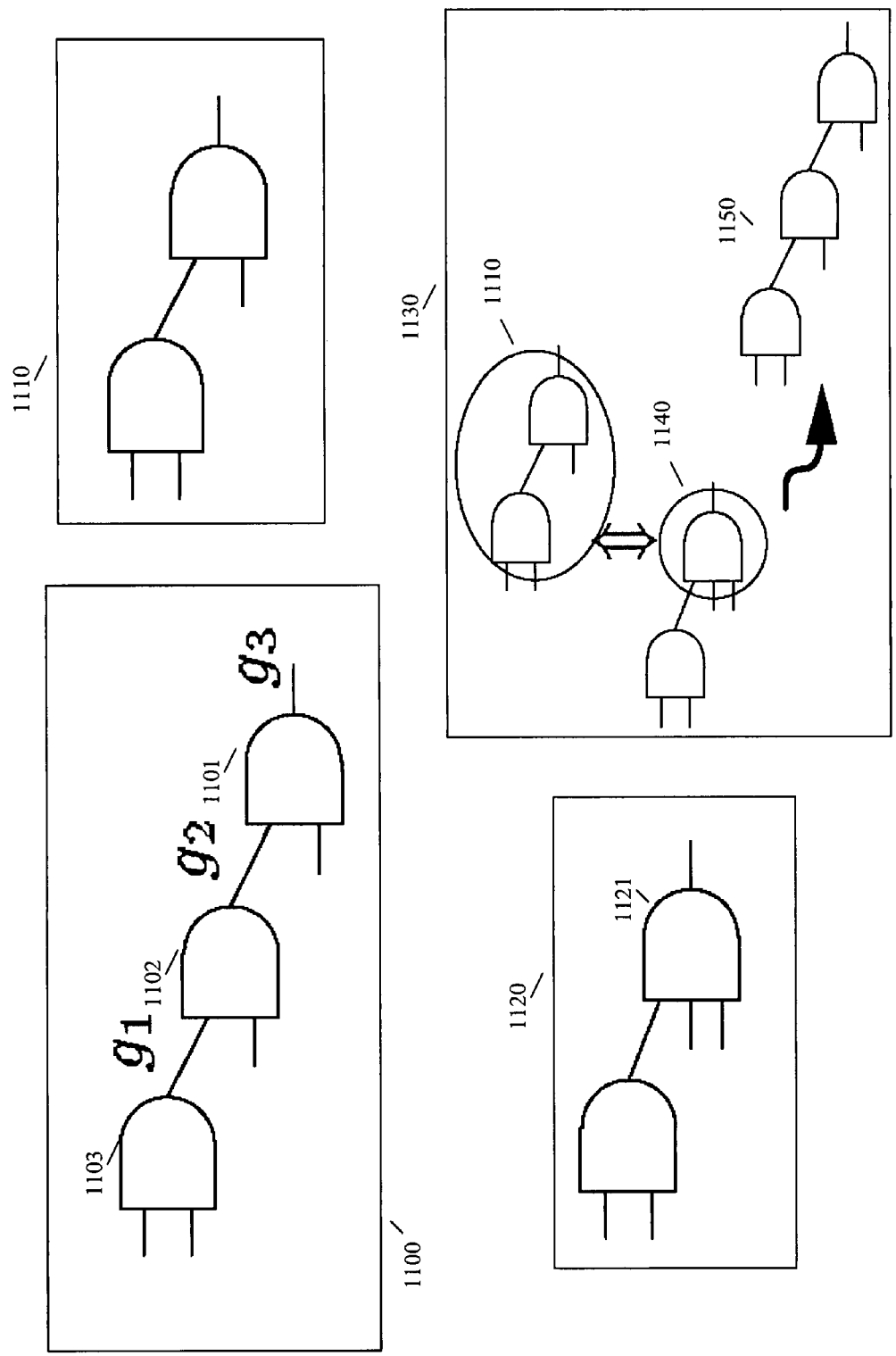
FIG. 11. is an illustration of matching cells in accordance with some embodiments of the disclosed subject matter.

An example of matching is illustrated in FIG. 11, where a cell library 230 contains both a three-input AND cell and a four-input AND cell. As shown, tree 1100 with root g3 1101, can be matched with both the three-input AND 1110 (for gates 1101 and 1102) cell and with the four-input AND cell 1120 (for gates 1101, 1102, and 1103).

FIG. 11 can also be used to illustrate macro-expansion. As shown, the root vertex 1121 in a three-input AND cell can be macro-expanded with a pattern graph, at 1110, which is also a three-input AND cell, to produce macro-expanded pattern 1150.

Figure 12:
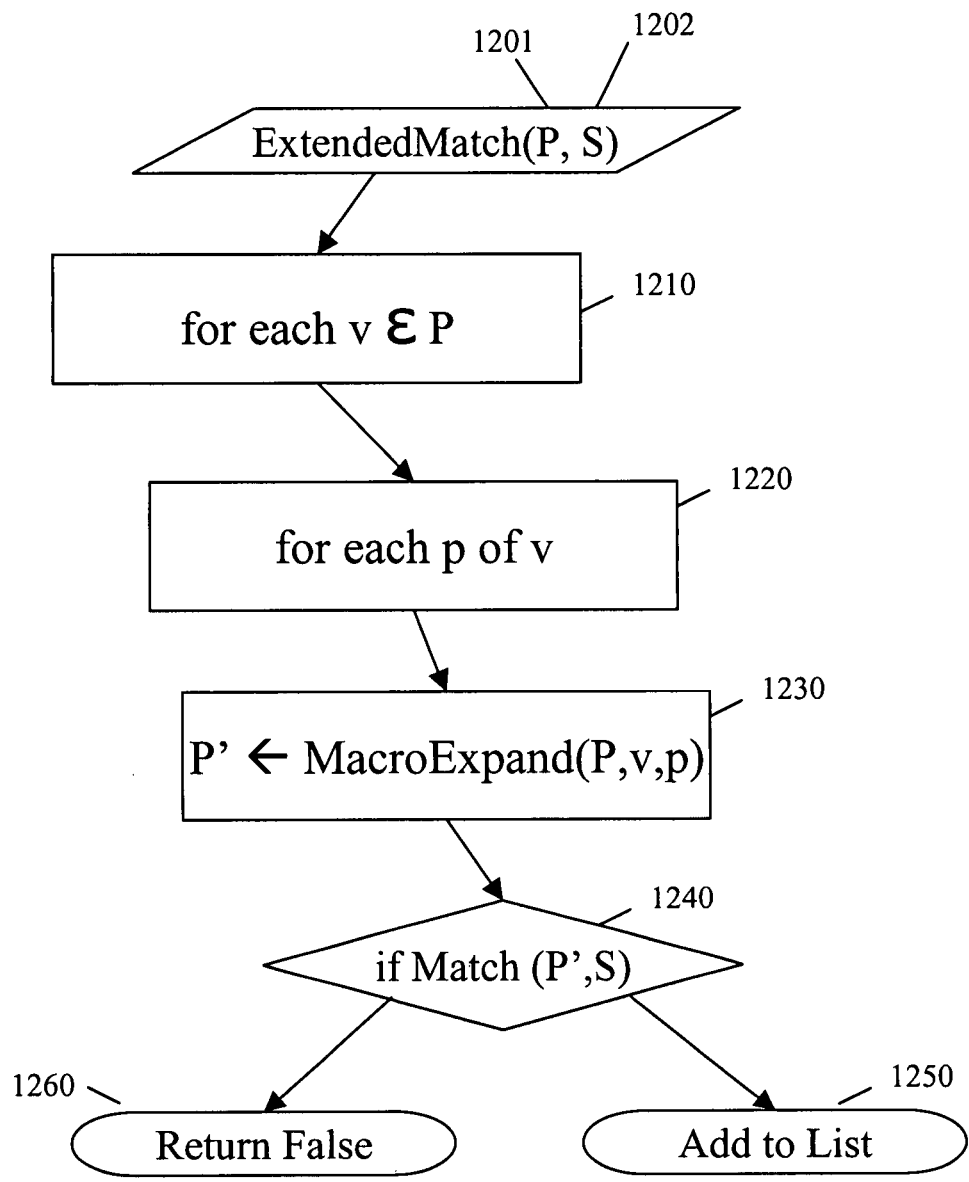
FIG. 12 is a simplified illustration of a method for matching a pattern graph with a subject graph in accordance with some embodiments of the disclosed subject matter.

FIG. 12 illustrates an example, of an expanded matching process 726 of FIG. 7. Given a pattern graph P 1201 (e.g., of the pattern graphs 740) and a subject graph S 1202 (e.g., subject graph 711), for each vertex v, at 1210, of the pattern P, v can be macro-expanded, at 1230, for each pattern p of v, at 1220, so that v can be substituted with one of more pattern graph of v. The expanded pattern graph P' can be matched, at 1240, against the subject graph 1202 using a match process, such as, for example, that illustrated in FIG. 6. When at least one expanded pattern graph of P' matches the subject graph S, at 1240, the process can add the match or matches to a list of matches 215, at 1250. Otherwise, it can return, at 1260, without recording a match.

A covering process 734 of FIG. 7 for cell merger can be the same or similar as that 234 of FIG. 2.

Some embodiments can optimize and/or improve asynchronous threshold networks based on eager evaluation. For example, every gate can be optimized and/or improved and local completion detectors can be added. In other embodiments, only some gates may be optimized through relaxation (i.e., transforming non-eager gates into gates with no loss of overall loss of timing robustness), in which case, no local completion detectors are used to ensure gate-orphan-free completion.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A method for forming a bound network, comprising:
decomposing an asynchronous input network to form a network of base functions, wherein the network of base functions is selected to include simple base functions that include two-input threshold OR functions and two-input threshold AND functions with hysteresis if the simple base functions would not create hazards in the network of base functions, and selected to include complex base functions if the simple base functions would create hazards in the network of base functions, generated during the decomposing;
partitioning the network of base functions into at least one subject graph that includes a plurality of different portions, each portion of the at least one subject graph having a function;
determining matches between the at least one subject graph and one or more pattern graphs; and
forming the bound network by selecting at least one of the one or more pattern graphs to be used in the bound network for the function of each of the different portions of the at least one subject graph.

2. The method of claim 1, wherein decomposing comprises determining if a vertex in the asynchronous input network was produced by cell merger.

3. The method of claim 1, wherein the decomposing comprises determining if a vertex in the asynchronous input network is one of the simple base functions.

4. The method of claim 1, wherein the decomposing comprises determining if a vertex in the asynchronous input network is an threshold OR function with two or more inputs.

5. The method of claim 1, wherein the decomposing comprises registering a vertex of the asynchronous input network as a complex base function.

6. The method of claim 1, further comprising generating the one or more pattern graphs by decomposing cells of a technology library.

7. The method of claim 1, wherein the partitioning partitions the network of base functions into at least two subject graphs at a vertex with multiple fan-outs in the network of base functions.

8. The method of claim 1, wherein determining matches comprises determining if one of the one or more pattern graphs is a leaf.

9. The method of claim 1, wherein determining matches comprises determining if one of the at least one subject graphs is a leaf.

10. The method of claim 1, wherein determining matches comprises determining if a cell function of one of the one or more pattern graphs is different from a cell function of the root of one of the at least one subject graph.

11. The method of claim 1, wherein one of the one or more pattern graphs has a root with fan-ins and one of the at least one subject graphs has a root with fan-ins, and wherein determining matches comprises determining if the fan-ins of the root of the one of the one or more pattern graphs matches the fan-ins of the root of the one of the at least one subject graph.

12. The method of claim 1, further comprising manufacturing a circuit from the bound network.

13. The method of claim 1, wherein the bound network is hazard-free.

14. A computer-readable medium containing computer-executable instructions that, when executed by a processor, cause the processor to perform a method for forming a bound network, the method comprising:

decomposing an asynchronous input network to form a network of base functions, wherein the network of base functions is selected to include simple base functions that include two-input threshold OR functions and two-input threshold AND functions with hysteresis if the simple base functions would not create hazards in the network of base functions, and selected to include complex base functions if the simple base functions would create hazards in the network of base functions, generated during the decomposing;

partitioning the network of base functions into at least one subject graph that includes a plurality of different portions, each portion of the at least one subject graph having a function;

determining matches between the at least one subject graph and one or more pattern graphs; and selecting at least one of the one or more pattern graphs to be used in the bound network for the function of each of the different portions of the at least one subject graph.

15. The medium of claim 14, wherein decomposing comprises determining if a vertex in the asynchronous input network was produced by cell merger.

16. The medium of claim 14, wherein the decomposing comprises determining if a vertex in the asynchronous input network is one of the simple base functions.

17. The medium of claim 14, wherein the decomposing comprises determining if a vertex in the asynchronous input network is an threshold OR function with two or more inputs.

18. The medium of claim 14, wherein the decomposing comprises registering a vertex of the asynchronous input network as a complex base function.

19. The medium of claim 14, wherein the method further comprises generating the one or more pattern graphs by decomposing cells of a technology library.

20. The medium of claim 14, wherein the partitioning partitions the network of base functions into at least two subject graphs at a vertex with multiple fan-outs in the network of base functions.

21. The medium of claim 14, wherein determining matches comprises determining if one of the one or more pattern graphs is a leaf.

22. The medium of claim 14, wherein determining matches comprises determining if one of the at least one subject graphs is a leaf.

23. The medium of claim 14, wherein determining matches comprises determining if a cell function of one of the one or more pattern graphs is different from a cell function of the root of one of the at least one subject graph.

24. The medium of claim 14, wherein one of the one or more pattern graphs has a root with fan-ins and one of the at least one subject graph has a root with fan-ins, and wherein determining matches comprises determining if the fan-ins of the root of the one of the one or more pattern graphs matches the fan-ins of the root of the one of the at least one subject graph.

25. The medium of claim 14, wherein the bound network is hazard-free.

* * * * *